United States Patent [19]

Munguia

[11] Patent Number: 5,042,678
[45] Date of Patent: Aug. 27, 1991

[54] FUEL TANK FILLER TUBE CLOSURE ASSEMBLY

[76] Inventor: Preston T. Munguia, 4111 Peppertree La., Silver Spring, Md. 20906

[21] Appl. No.: 554,912

[22] Filed: Jul. 20, 1990

[51] Int. Cl.⁵ .............................................. B65D 51/18
[52] U.S. Cl. ..................... 220/254; 220/212; 220/231; 220/303; 220/371; 220/DIG. 33; 141/392; 137/588; 137/199; 137/200
[58] Field of Search ............. 220/212, 231, 254, 303, 220/371, 373, DIG. 33, 85 VR, 85 VS, 256, 259; 137/588, 199, 200; 141/392

[56] References Cited

U.S. PATENT DOCUMENTS

| | | | |
|---|---|---|---|
| 2,551,058 | 5/1951 | Selzler et al. | 220/254 |
| 2,663,456 | 12/1953 | Schultz et al. | |
| 2,962,185 | 11/1960 | Starr et al. | 220/254 |
| 3,019,807 | 2/1962 | Projahn | 137/199 |
| 3,815,776 | 6/1974 | MacMillan | |
| 3,825,147 | 7/1974 | Naponen et al. | |
| 3,961,724 | 6/1976 | Kapsy | |
| 3,977,560 | 8/1976 | Stumpf et al. | 220/265 |
| 4,175,671 | 11/1979 | Holl et al. | 220/235 |
| 4,312,649 | 1/1982 | Fujii et al. | |
| 4,696,409 | 9/1987 | Vize | |
| 4,714,172 | 12/1987 | Morris | 220/86 R |
| 4,762,247 | 8/1988 | Temmesfeld | |
| 4,809,864 | 3/1989 | Neuthard et al. | 220/86 R |
| 4,884,716 | 12/1989 | Steiner | 220/202 |
| 4,977,936 | 12/1990 | Thompson et al. | 141/312 |
| 4,986,439 | 1/1991 | Ott et al. | 220/234 |

Primary Examiner—Stephen Marcus
Assistant Examiner—Stephen Cronin
Attorney, Agent, or Firm—William L. Gates

[57] ABSTRACT

The foregoing and other objects of the invention will be realized by a closure assembly engageable with the filler tube of a fuel tank for preventing the outflow of fuel vapors from the fuel tank during a filling procedure and including a manually grippable generally circular top member having a central axial opening therein for permitting the passage of a fuel delivery nozzle therethrough and receiving a relatively smaller press fitted cap thereat. A threaded bottom member of generally circular cross section extends from the top member for threadable engagement with a threaded opening in the filler tube. The bottom member is of a generally hollow construction and has a central axial opening therein and in which a resilient circular annular fuel vapor absorbent filter element is located. The filter element has an opening therein for permitting the passage of the fuel nozzle therethrough while remaining in contact therewith so as to prevent any fuel vapor surrounding the nozzle and not absorbed from escaping upwardly into and out of the top member.

13 Claims, 1 Drawing Sheet

FUEL TANK FILLER TUBE CLOSURE ASSEMBLY

BACKGROUND OF THE INVENTION

This invention relates generally to means for closing the filler tube of containers such as fuel tanks, and the like, and more particularly to a safety type closure assembly which prevents fuel vapors from escaping from the fuel tank at the time of refueling a vehicle or pumping fuel into a container.

In conventional type fuel systems for motor vehicles, a vented type of filler cap is screwed on or otherwise secured to the outer end of a filler tube to prevent fuel loss from the fuel tank. The filler caps take many forms and some even include filter elements which operate to filter incoming air and/or prevent dirt from entering relief valve assemblies while in position on the filler tube.

However, when one proceeds to refuel or otherwise add fuel to the tank, the filler cap must be removed and the operator must then insert a fuel delivery nozzle into the top of the filler tube which at the same time opens a spring loaded flap valve located at the outer end of the filler tube. In doing so and during the course of a filling procedure, fuel vapors in the tank and the filling tube rise and escape to the surrounding environment. The resulting fumes not only have a noxious affect on the person(s) in the immediate vicinity, but can result in sickness and headaches in persons breathing the vapors and in some cases eventually causes and/or aggravates respiratory illnesses in such person(s).

It is an object of the present invention, therefore, to provide an improvement in closures for fuel tanks.

It is a further object of the invention to provide an improvement in fuel tank closures which is of a relatively simple construction for preventing the outflow of fuel vapors from a fuel tank during a filling procedure.

It is yet another object of the invention to provide an improvement in closure assemblies for fuel tanks which act to decrease pollution of the environment and decrease the health hazards associated with breathing fumes associated with fuels used to power internal combustion engines.

And it is still another object of the invention to provide an improvement in closure assemblies for fuel tanks which permit refueling without removing the closure assembly from the filler tube of a fuel tank.

SUMMARY

The foregoing and other objects of the invention will be realized by a closure assembly engageable with the filler tube of a fuel tank for preventing the outflow of fuel vapors from the fuel tank during a filling procedure and including a manually grippable generally circular top member having a central axial opening therein for permitting the passage of a fuel delivery nozzle therethrough and receiving a relatively smaller press fitted cap thereat. A threaded bottom member of generally circular cross section extends from the top member for threadable engagement with a threaded opening in the filler tube. The bottom member is of a generally hollow construction and has a central axial opening therein and in which there is located at least one elastically resilient fuel vapor absorbent filter element. The filter element has an opening therein for permitting the passage of the fuel nozzle therethrough while remaining in contact therewith so as to prevent any fuel vapor surrounding the nozzle from escaping while absorbing the remainder.

BRIEF DESCRIPTION OF THE DRAWINGS

The following detailed description of the invention will be more readily understood when considered with the drawing figures wherein.

DETAILED DESCRIPTION OF THE INVENTION

Figure 1:
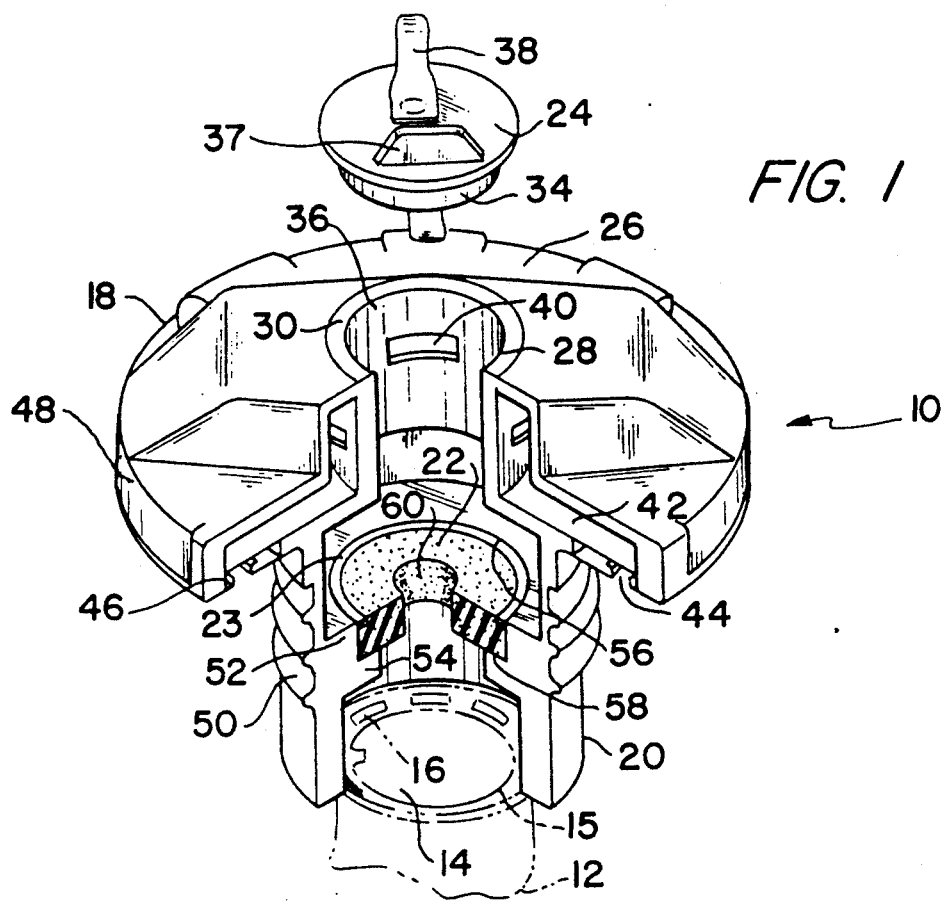
FIG. 1 is a perspective view of the preferred embodiment of the invention with a longitudinal cross section removed.

Referring now to the drawings and more particularly to FIG. 1, reference numeral 10 denotes a closure assembly in accordance with the preferred embodiment of the invention and which engages a conventional threaded end section, not shown, of a filler tube 12 for a fuel tank, also not shown. The outer end of the filler tube 12, moreover, is shown including a well known spring loaded flap valve 14 and one or more vent openings 16 for equalizing pressure in the fuel tank in accordance with the known prior art.

The invention is more particularly directed to the construction of the closure assembly 10 and is comprised of four major parts, namely a manually grippable top member 18; a relatively elongated threaded bottom member 20; a fuel vapor absorbent filter member 22; and a relatively smaller cap member 24.

Figure 2:
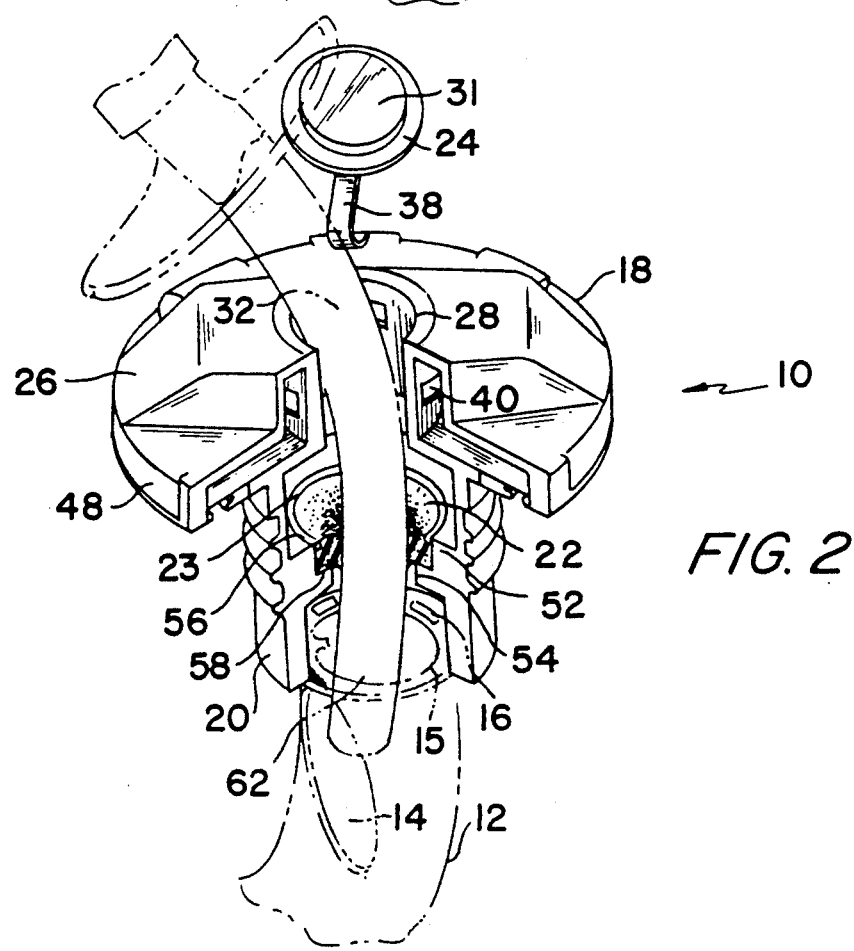
FIG. 2 is a perspective view of the embodiment shown in FIG. 1 with a filling nozzle inserted and shown by way of a phantom view thereof.

The top member 18 is of generally circular cross section and includes a relatively larger body member 26 similar to a conventional gas cap with the exception that a central circular opening 28 having a beveled edge 30 is formed therethrough. The circular opening 28 is of a predetermined size to receive a fuel delivery nozzle 32, as shown in FIG. 2. The cap 24 is also sized to engage the opening 28 in a press fit so that the circular segment 34 engages the inner side surface 36. A small external pull tab 37 is fabricated on the top of the cap 24 so that the cap can be manually lifted upwards when insertion of a fuel nozzle 32 is desired. A flexible connection element 38 is used to attach the cap to the outer edge of the body member 26.

The inner side surface 36 of the opening 28, moreover, includes one or more vent openings 40 which communicate with a vent passage 42 which communicates to one or more openings 44 formed in the undersurface 46 of the outer rim portion 48 of the upper body member 26.

Turning attention now to the threaded bottom member 20, it includes an outer surface 50 of raised threads which are adapted to engage a like set of threads formed on the inner surface of a threaded end section, not shown, of the filler tube 12. This type of structure is well known to those skilled in the art. The bottom member 20 is integral with the top member 18 and is generally hollow and having a central axial opening defined by a pair of inwardly projecting circular rim segments 52 and 54 with the segment 54 projecting inwardly a greater distance to provide a pair of mutually right angled support surfaces 56 and 58 for seating and holding the filter element 22.

The filter element 22 is held in place by a retaining ring 23 and is comprised of an elastically resilient thermoplastic polymer such as polyurethane, which is impregnated or otherwise treated with fuel vapor absorbent material, such as charcoal, in the form of ground up particles. The filter element, moreover, includes a central circular opening 60 having a diameter which is selected to be less than the diameter of the nozzle 32. When desirable, the bottom member 20 can be configured to accommodate two filter elements 22 coaxially arranged therein.

As shown in FIG. 2, when the nozzle 32 is inserted into the top opening 28 of the body member 26, it passes through the filter element 22 so that it deforms slightly while remaining in frictional contact therewith as the forward end 62 of the nozzle strikes the flap valve 14, causing it to open. Thereafter, delivery of fuel into the fuel tank via the filling tube 12 is accompanied without the escape of fuel vapors generated during the fuel delivery procedure because any vapors rising through the opening 15 and/or the vent openings 16 will be trapped and absorbed by the filter element 24 before they can reach the central opening 28 and the vent openings 40 in the top body member 26.

Thus there is no contamination of the environment by the fuel vapors generated during refueling. Upon termination of the filling procedure, the nozzle 32 is removed, the flap valve 14 closes and the small cap 24 is again placed in position on the opening 28. Thereafter the vapors which might remain in the upper portion of the fill tube 12 will be substantially absorbed by the filter element 22 with only a negligible amount escaping out of the top member body via the vent openings 40.

Thus what has been shown and described is a new and improved gas cap assembly of relatively simple construction and which is particularly adapted to absorb fuel vapors and other noxious fumes which would otherwise escape into the environment during a fuel filling procedure via a conventional fuel delivery system.

Having thus shown and described what is at present considered to be the preferred embodiment of the invention, it should be noted that the same has been made by way of illustration and not limitation. Accordingly, all modifications, alterations and changes coming within the spirit and scope of the invention as defined by the appended claims are herein meant to be included.

I claim:

1. A closure assembly engageable with a filler tube of a fuel tank for preventing outflow of fuel vapor from the fuel tank during a filling procedure, comprising:
   a manually grippable top member having a central axial opening therein for permitting the passage of a fuel delivery nozzle therethrough;
   a threaded bottom member of circular cross section integral with said top member for threadably engaging a threaded end section in the filler tube and being generally hollow and having a central axial opening therein; and
   fuel vapor absorbent means located interiorally of said bottom member in the central axial opening thereof and having an opening of a predetermined size therein for permitting the passage of the fuel nozzle therethrough yet contacting the nozzle so as to prevent any open space surrounding the fuel nozzle whereby any fuel vapor rising in the filler tube and tending to escape will be trapped and absorbed prior to reaching said top member.

2. The closure assembly as defined by claim 1 wherein said fuel vapor absorbent means comprises an elastically resilient filter element.

3. The closure assembly as defined by claim 2 wherein said filter element comprises an annular ring type filter element secured to an inside surface of said bottom member.

4. The closure assembly as defined by claim 3 wherein said inside surface of the bottom member includes an inwardly projecting means upon which said annular ring type filter element is positioned and held in place.

5. The closure assembly as defined by claim 3 wherein said filter element is impregnated with activated carbon particles.

6. The closure assembly as defined by claim 3 wherein said filter element is comprised of polyurethane impregnated with particles of charcoal.

7. The closure assembly as defined by claim 3 wherein said filter element includes a central opening having a diameter less than the diameter of a predetermined sized fuel nozzle.

8. The closure assembly as defined by claim 3 wherein said top member comprises a body member including a vent passage and further including an outer rim having at least one opening in the under surface thereof connected to said vent passage.

9. The closure assembly as defined by claim 3 wherein said top member comprises a generally circular type cap.

10. The closure assembly as defined by claim 9 and additionally including a relatively smaller cap member having a size to frictionally engage and be press fitted into a seat at the central axial opening of said top member and being removable on demand for the insertion of the fuel delivery nozzle.

11. The closure assembly as defined by claim 10 wherein said top member has a circular cross section relatively larger in size than the cross section of said threaded bottom member.

12. The closure assembly as defined by claim 11 wherein said top member includes a body member having a vent passage therein.

13. The closure assembly as defined by claim 12 wherein said body member includes an outer rim having at least one opening in the under surface thereof connected to said vent passage.

* * * * *